United States Patent Office 3,078,429
Patented Feb. 19, 1963

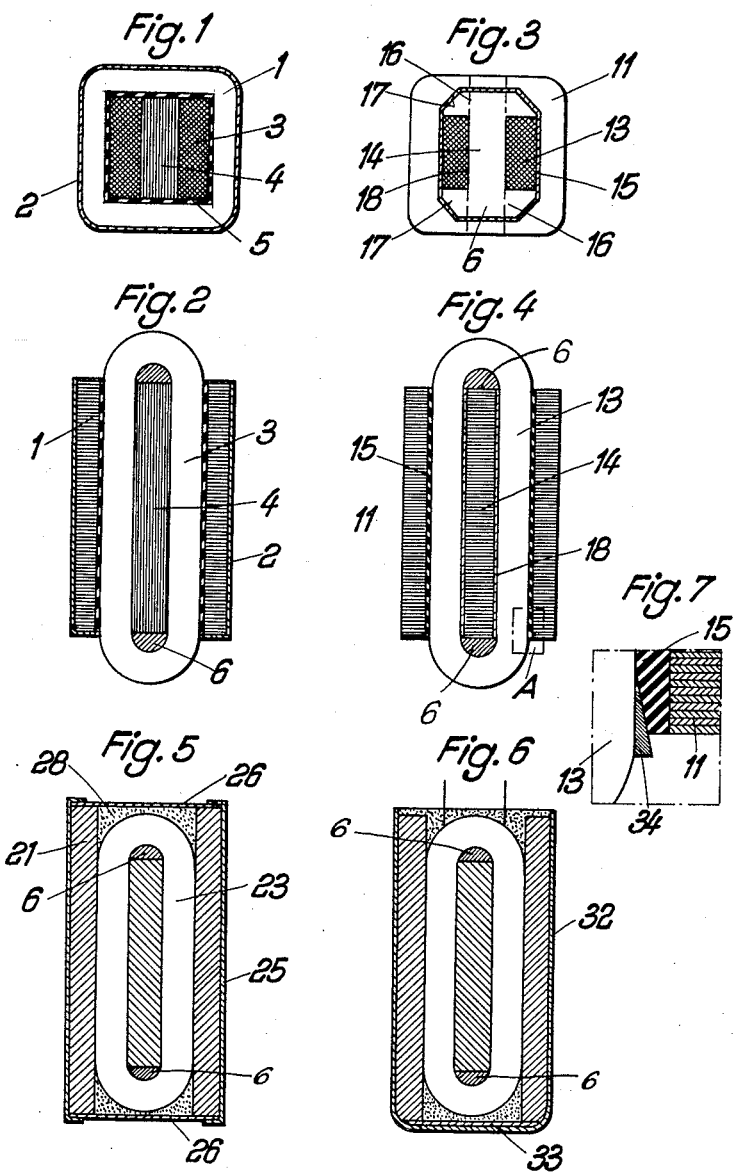

3,078,429
CURRENT-LIMITING REACTORS FOR
FLUORESCENT TUBES OR THE LIKE
Ernst Wiesner, Bergstrasse 14, Dornbirn, Austria
Filed Dec. 22, 1958, Ser. No. 782,207
4 Claims. (Cl. 336—83)

The present invention relates to current-limiting reactors for fluorescent tubes or the like, which can be accommodated even in very slender lamp fixture brackets.

It is an object of the present invention so to construct the reactors that the iron parts closing the magnetic circuit are as short as possible so that reactors of smallest size are obtained, which are subject only to a slight temperature rise even in prolonged operation.

Another object of the present invention resides in combining the reactor components such as core, winding and outer iron shell like a block without occurrence of magnetic shunts.

It is a further object of the present invention so to construct the several components of the reactor that technical difficulties do not occur in the mass manufacture of components and complete reactors and, above all, that additional parts, auxiliary devices and re-machining are not required.

According to the invention such a reactor is constructed as a shell-type reactor having an iron-closed magnetic circuit and in which the iron shell viewed in that plane of the magnetic flux which coincides with the plane of the smallest cross-section of the iron shell surrounds the core of ferromagnetic material and the winding so as to define air gaps having a cross-sectional area in the form of a closed ring. The core, which is preferably of H-shaped cross-section, and the winding carried by it, as well as insulating materials which determine the size of the air gap and extend substantially throughout the length of the shell, are combined like a block and located relative to each other.

Further details of the invention will be stated in the following description of illustrative embodiments.

FIG. 1 is a transverse-sectional view showing a shell-type reactor having an iron-closed magnetic circuit.

FIG. 2 is a longitudinal sectional view showing the reactor of FIG. 1.

FIG. 3 is another transverse sectional view of a reactor having an iron shell and a core of H-shaped cross-section.

FIG. 4 is a vertical longitudinal sectional view of the reactor of FIG. 3.

FIG. 5 is a longitudinal sectional view showing a reactor according to the invention having a tubular protective sheath.

FIG. 6 shows a reactor having a cup-shaped sheath.

FIG. 7 is an enlarged view of the section A of FIG. 4.

The reactor shown in FIGS. 1 and 2 comprises a tubular shell 1 which when viewed in the plane of section defining the smallest cross-sectional area of the shell forms a completely closed square ring. The shell 1 is made of ferromagnetic material. Due to its manufacture by punching, pressing, bending, drawing, casting or the like, small inside tolerances can be obtained without special expenditure whereas its cross-sectional shape, which is governed by electrical considerations, ensures a high mechanical stability.

The shell is surrounded by a tube 2 which is constructed as a protective sheath with inturned ends and may consist of metallic material or plastic. This is particularly suitable if the shell 1 consists of individual laminations or of stamped sheet metal frames or rings, which are held together by the tube 2.

The winding 3 encloses the core 4 and may be formed as an insulated shaped coil or be wound on a former.

The core 4 is also manufactured to have close tolerances at its side faces, which define butt joints or air gaps with the shell. The core 4 and the coil 3 are surrounded by a sheath 5 of insulating material and may be inserted as a unit into the shell 1. Wedges 6 for locating the coil 3 and the core 4 are provided between the winding heads formed by the coil 3 and the core 4. The core 4 carrying the coil 3 is located inside the shell 1 during the insertion of the core and winding into the shell. To this end the insulating wrapper 5 is deformed with progressively increasing wedge pressure outside of the air gap passed through by the main magnetic flux. Thus the parts fitted together are frictionally held. The angled portions of the tubular protective sheath 2 hold the laminated shell in its compressed position.

In the illustrative embodiments shown in FIGS. 3 and 4 the annular shell 11, which is closed without joint, surrounds the core 14, which is of H-shaped cross-section and carries the coil 13. An insulating sheath 15 is provided between the core and shell. The flanges 16 of the core are bevelled or rounded at the external edges at 17 to avoid sharp kinks and resulting constrictions in the path of the lines of force. The core 14 is provided with insulation 18 on its wound surface. The H-shaped design of the core enables an improved utilization of the winding space and heat dissipation and the above-mentioned improved configuration of the lines of force in the area where they must change their direction. At the same time, the design of the core and shell according to FIGS. 3 and 4 enables the air gap area to be widened throughout the outside surface of the flanges 16 so that the air gap induction is reduced compared to reactors according to FIG. 1 for the same excitation. It is apparent from FIGS. 3 and 4 that the wedges 6 driven in between the winding heads and the end laminations of the iron core are greater in length than the associated bearing surface on the end laminations of the core 14 so that they engage also the end laminations of the ring-shaped shell 11 and thus assist in locating the core and winding relative to the ring-shaped shell 11. Thus, these parts can be reliably located relative to each other even if there is a slight play between them. The insulating sheath 15 can be so dimensioned adjacent to the air gap passed through by the main magnetic flux or outside the same that it serves for frictionally locating the core 14 with the winding 13 carried by it relative to the ring-shaped shell 11, as has been described in conjunction with FIGS. 1 and 2. In the reactor constructed according to FIGS. 3 and 4 the wedges 6 have the additional function to hold the laminations of the shell 11 in their compressed position in the absence of a sheath 2 (FIG. 2). To assemble the coil, it is sufficient to compress the laminations to form the shell by suitable means and, to insert the core 14 with the winding 13 and the insulating sheath 15 if desired under pressure, into the shell while the same is held compressed, whereafter the wedges 6 are driven to locate the parts relative to each other so that the components are combined in a block.

If the insulating sleeve 15 is not to be used for locating the core 14 carrying the winding 13 in the annular shell 11, as is shown in FIG. 7, wedges 34 are suitably driven between the winding 13 and the insulating sheath 15 adjacent to the end laminations of the iron shell so that the components assembled to form the reactor are again located relative to each other.

FIG. 5 shows a reactor which is similar to that of FIGS. 1 to 3, but has a shell 21 having the length of the winding 23 or reaching the same with the aid of washers of any desired material. This enables an entirely closed construction by the provision of a magnetically shielding sheath 25 and of end covers 26 held by inturned flanges. The cavities 28 adjacent to the winding heads may be filled with sealing compound. In the coil constructed according to FIG. 5 the wedges 6 serve again only for locating the winding 23 on the core whereas a longitudinal displacement of the core with the winding in the opening of the ring-shaped shell is prevented by the sealing compound in the cavities 28 and by the end laminations. The air gap between the core or winding, on the one hand, and the outer shell, on the other hand, is filled as in FIG. 1 by an insulating sheath, which is suitably also dimensioned to be able to frictionally locate the core and shell relative to each other outside the air gap passed through by the main magnetic flux.

Another embodiment of the reactor according to the present invention is shown in FIG. 6, according to which the shell, into the opening of which the core is inserted, which carries the winding, is arranged in a cup-shaped sheath 32. An insulating member 33 is provided at the bottom of the cup. The shell parts which are required for magnetic purposes to extend beyond the length of the core may be replaced here by other parts of any desired material, as in the construction according to FIG. 5.

The cup-shaped construction of the sheath 32 enables the reactor to be manufactured as is usual for capacitors, particularly as regards the impregnation and the formation of the seal and of the electrical connections. It enables also a vacuum impregnation with a cast resin. Wedges 6 are again provided for locating the winding on the core. The core and winding are again located in the sheath either by the wedges 6 (FIG. 3), by a suitable dimensioning of the insulating sheath for these parts or by additional wedges 34 according to FIG. 7. The core and winding are additionally located by the insulating material used as a seal because the insulating material firmly adheres to the parts contacted by it.

In all embodiments the end pieces may serve as carriers of connecting lugs or terminals.

A reactor of the type disclosed in the foregoing may be required to be secured to a wall, a housing or the like. For this purpose one needs fixing elements. The fixing elements (not shown) may be cemented or may be riveted or seamed to the sheath or centrally arranged and formed with a screw thread or molded to the sheath in any desired form. Their external shape may be like that of the shell lamination and they may have an integral lug formed with the fixing recesses. These end pieces may be flanged onto the shell together with the sheath or may be wedged to the shell together with the core, the winding taking up also the tensile forces required for holding the shell together.

In all embodiments the shell may be shaped as required in its cross-section of smallest area. This cross-section may be, e.g., round or very flat and wide.

The closed shell of such reactors prevents practically any leakage of the lines of magnetic force toward the outside and takes up the magnetic forces. Due to its symmetric arrangement the core is held embedded between two identical gaps and is free from any forces. These gaps prevent the transmission of the magnetostrictive movements of the core to the shell and the environment. The insulating layer between the winding and core, on the one hand, and the shell, on the other hand, ensures a particularly reliable insulation against the shell. The increase of the air gap area relative to the iron cross-section (FIGURES 3, 4) does not only afford an improved utilization of the winding space and an increase of the permissible air gap tolerances but reduces also the air gap induction to reduce the leakage and magnetic forces because they decrease in inverse proportion with the square of the induction and increase only in linear proportion with the air gap area. For this reason the new arrangement does not require the provision of rivets or screws. Whereas the dimension of the device in one dimension or two may be restricted to very small values the third dimension may be increased as desired. This accommodates the accommodation in very slender lighting fixture brackets. In spite of the reduction in material expenditure, volume and weight the electrical and thermal qualities are improved in conjunction with a perfect freedom from hum.

What is claimed is:

1. A current limiting block-like reactor for fluorescent tubes, comprising: a core made of laminated street iron; at least one winding disposed on said core and having winding heads; a tubular shell made of laminated sheet iron for receiving said core and said winding; wedges disposed between said winding heads and said core for fixing the latter to said windings, said wedges being so shaped that their length is sufficient to make them in contiguous relationship with said shell and said core; and insulating material interposed between said shell and said iron core with windings for engagement of core and shell and defining an air gap which is passed through by a magnetic flux when the reactor is in operation, said wedges and said insulating material holding said reactor together.

2. A reactor as set forth in claim 1, said insulating material providing for frictional engagement of core and shell.

3. The reactor of claim 1, wherein said iron shell is composed of a stack of annularly shaped laminated sheets.

4. The reactor of claim 1, wherein the wedges are comprised of insulating material.

References Cited in the file of this patent

UNITED STATES PATENTS

| | | |
|---|---|---|
| 404,630 | Kelly | June 4, 1889 |
| 713,605 | Churchward | Nov. 18, 1902 |
| 1,417,710 | Ballman | May 30, 1922 |
| 2,829,356 | Allen | Apr. 1, 1958 |